Figure 1:
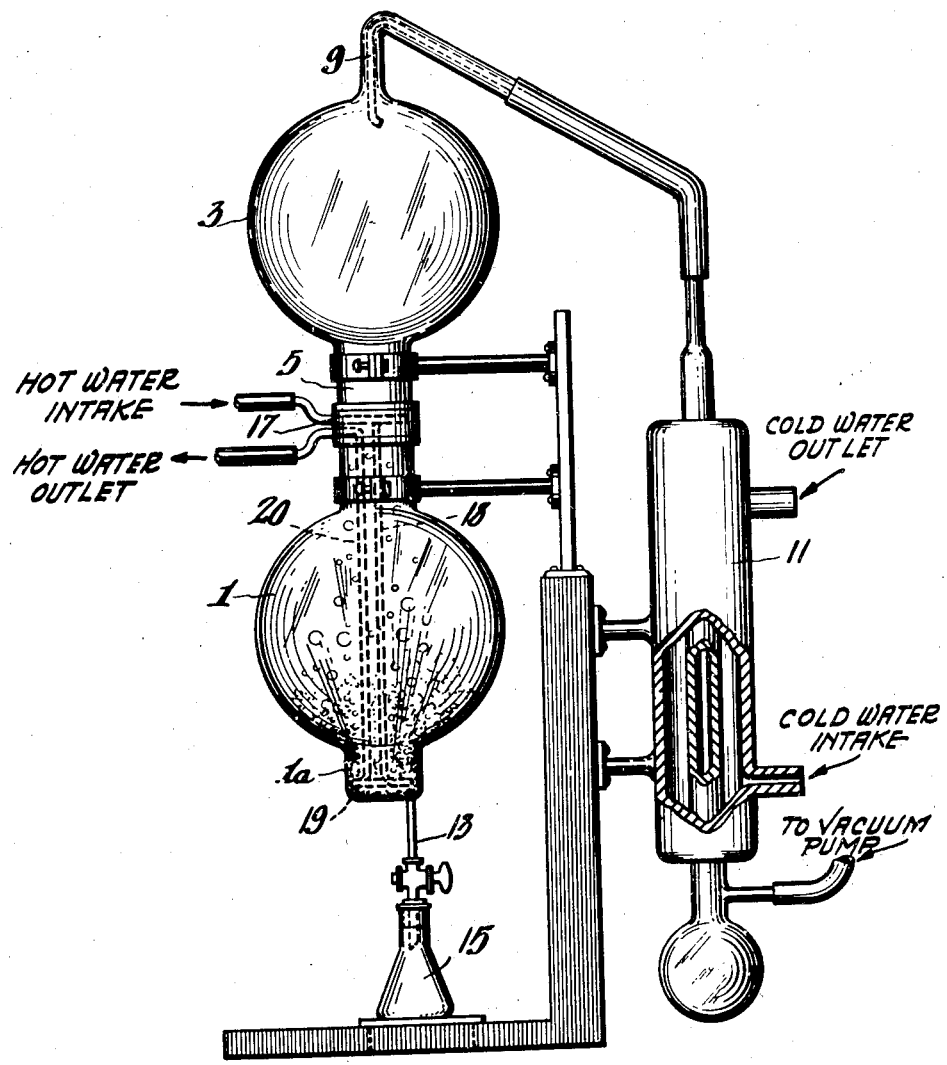

June 7, 1949. R. A. BIERWIRTH 2,472,562
ART OF DEHYDRATING EFFERVESCENT LIQUIDS
Filed July 31. 1944 3 Sheets-Sheet 1

Inventor
RUDOLPH A. BIERWIRTH
By
Attorney

June 7, 1949. R. A. BIERWIRTH 2,472,562
ART OF DEHYDRATING EFFERVESCENT LIQUIDS
Filed July 31, 1944 3 Sheets-Sheet 2

Inventor
RUDOLPH A. BIERWIRTH
By C. D. Tuska Attorney

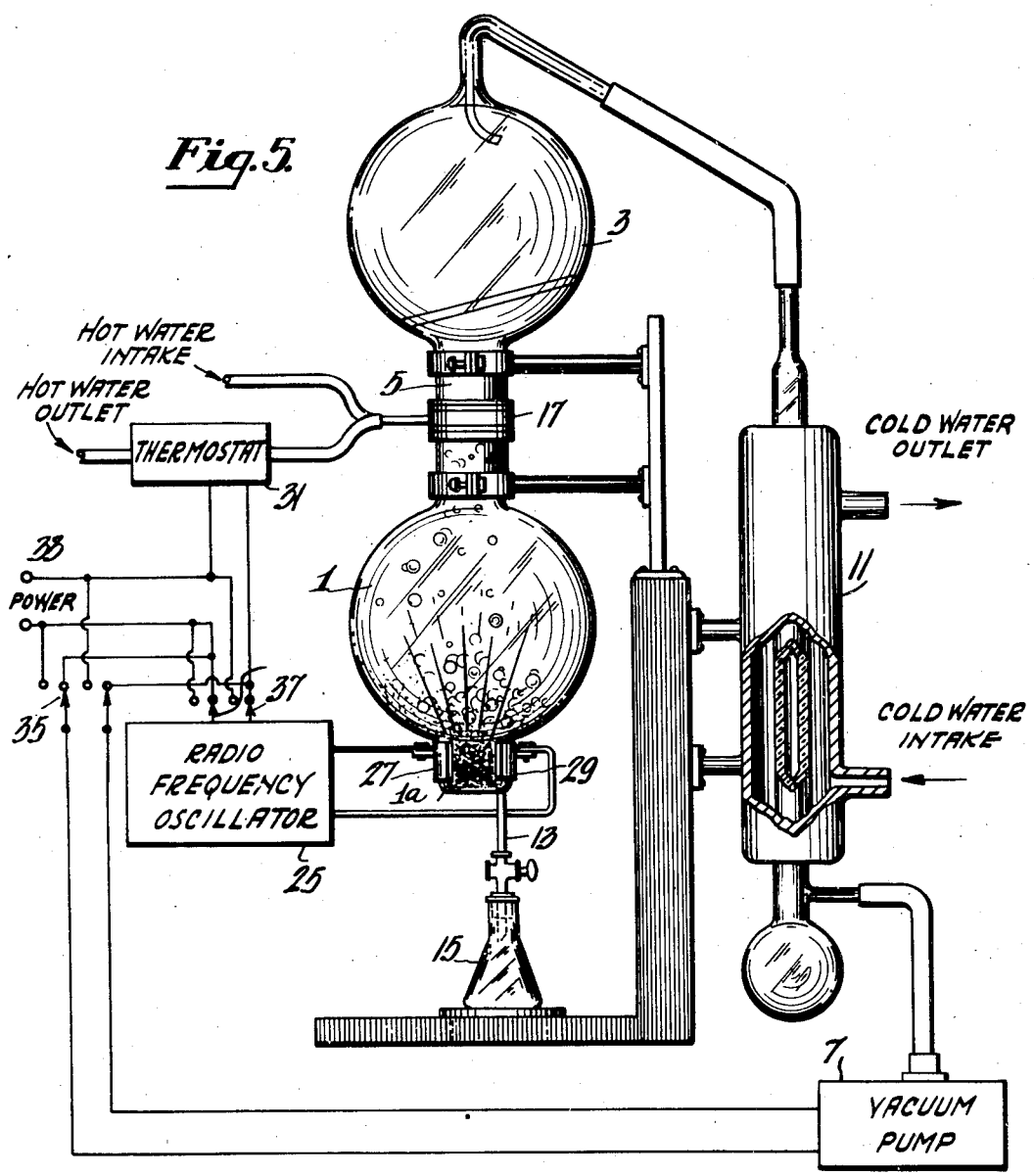

Patented June 7, 1949

2,472,562

UNITED STATES PATENT OFFICE 2,472,562

ART OF DEHYDRATING EFFERVESCENT LIQUIDS

Rudolph A. Bierwirth, Kingston, N. J., assignor to Radio Corporation of America, a corporation of Delaware Application July 31, 1944, Serial No. 547,497

4 Claims. (Cl. 159—47)

This invention relates to the concentration, by evaporation or distillation, of liquids containing animal, vegetable or mineral matter in solution and has special reference to the art of dehydrating liquids of the type which effervesce or foam when subjected to heat or to a vacuum.

Numerous foam-control or "save-all" systems have heretofore been proposed for preventing the less volatile constituents, or the solute or solids, in various ebullient liquids from being carried away in the foam or bubbles which are created when such liquids are subjected to conventional evaporation or distillation processes. Heckmann's German Patent No. 18,758 (1882) and Cornell's U. S. Patent 1,202,969 (1916) show typical foam-control systems. In Heckmann's and in Cornell's apparatus, a steam or hot water coil is mounted in a retort above the normal level of the liquid and in the path of the bubbles. The bubbles which approach or strike this "save-all" coil are subject to localized evaporation and are caused to burst, whereupon the liquid films of which the bubbles are comprised drop back into the batch so that none of the solute is lost and the only thing removed from the solution is its more volatile constituents or "moisture."

The principal objection to the above described and other prior art save-all systems is that they are not self-regulating and hence are not entirely satisfactory, especially when applied to apparatus for the dehydration of certain pharmaceutical and biological solutions (such, for example, as blood sera and the rare drug penicillin) and other liquids containing an active ingredient or "X-factor," the labile equilibrium of which may be adversely affected by improper regulation of the quantity of heat applied to the liquid by the heater and by the save-all coil.

Accordingly, the principal object of the present invention is to provide a highly efficient and rapid method of and apparatus for concentrating various materials, including pharmaceutical, biological and other liquids containing a thermo-sensitive "active ingredient."

Another and important object of the present invention is to provide a self-regulating "save-all" dehydrating apparatus and one characterized by the simplicity and economy of its parts and by its reliable and trouble-free performance.

Still another object of the invention is to provide a save-all system which is applicable to an evacuable dehydrator and/or one wherein the heat for concentrating the liquid is derived from a source of radio-frequency energy.

The foregoing and other objects are achieved in accordance with the method of the invention by heating the liquid, preferably under partial vacuum, so that it effervesces, then causing the bubbles or foam to enter a separately heated zone where these liquid films are broken by rapid evaporation and hence abstract some of the heat from the said zone, and then automatically regulating the effervescent condition of the liquid as determined by the quantity of heat abstracted from the said heated zone in evaporating and bursting the bubbles. The control system may operate to regulate the heat or the degree of vacuum (or both) to which the liquid is subjected. With the effervescent condition of the liquid thus controlled, the possibility of disturbing the labile equilibrium of the solution, or of the solute, is minimized. Furthermore, since the bubbles which arise from the liquid are broken upon entering the heated zone, none of the solute or solid matter originally in the liquid is lost.

Figure 2:
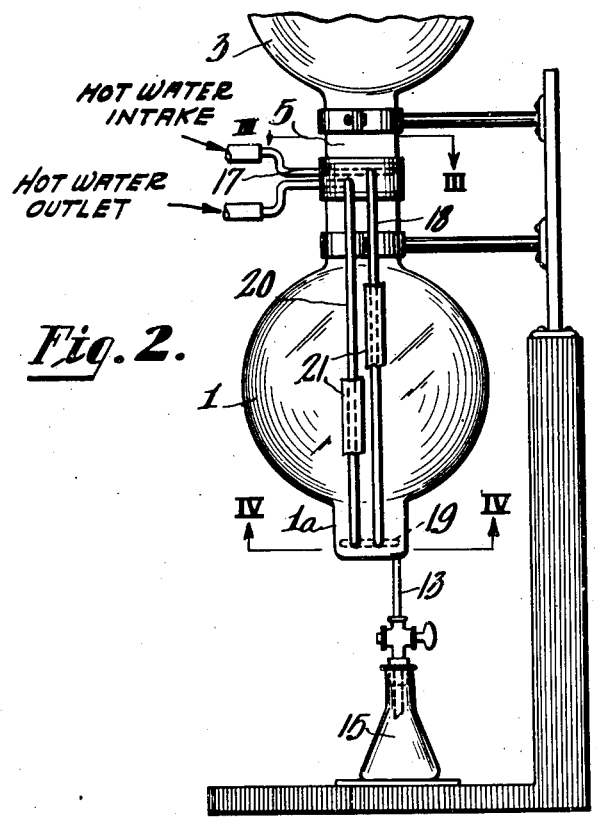
Figure 3:
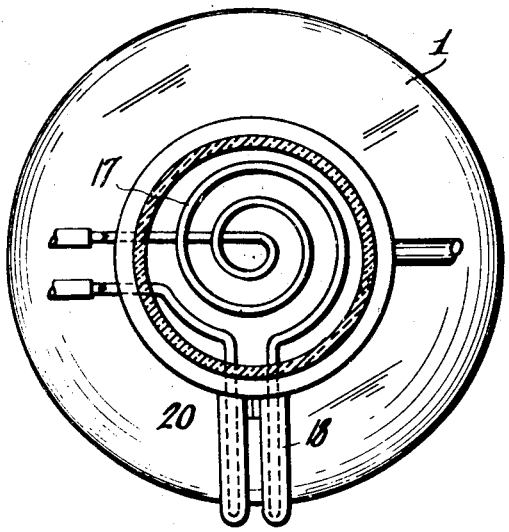
Figure 4:
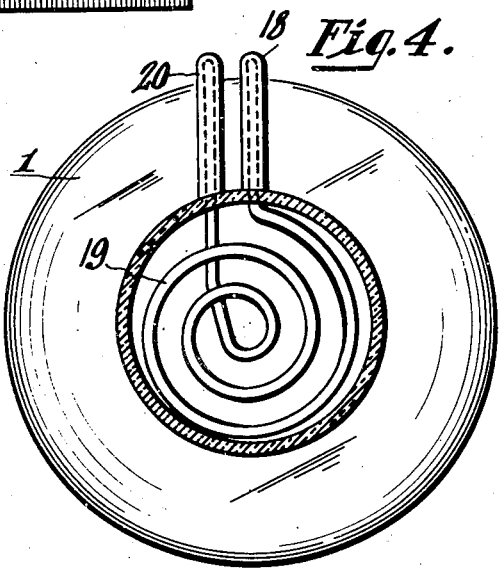

Certain preferred details of construction and operation will be apparent and the invention itself will be best understood by a reference to the following specification and to the accompanying drawings, wherein:

Figure 1 is an elevational view, partly in section, of a self-regulating evacuable dehydrating apparatus constructed in accordance with the principle of the invention, Figure 2 is an elevational view of a dehydrator similar to the one shown in Fig. 1, but with certain of the connections arranged in an alternative manner, Figures 3 and 4 are sectional views taken on the lines III—III and IV—IV, respectively, of Fig. 2, and Figure 5 is a partly diagrammatic elevational view of an electrically controlled evacuable dehydrator within the invention.

In the drawings, wherein like reference characters represent the same or corresponding parts in all figures, the chamber or retort in which the liquid is processed is designated 1. As here shown, the retort 1 comprises a bulbous glass bottle, considerably larger than the volume of liquid to be concentrated, and which is provided with a dependent base 1a. An inverted glass bottle 3, of similar contour, is mounted above the retort 1 and is connected to the said retort by a conduit 5 formed by placing the necks of the two bottles together and forming an air-tight seal about their edges. The upper bottle 3 comprises an expansion chamber and is connected to a vacuum pump 7 (Fig. 5) through a port 9 and a water cooled condenser 11. A glass tube 13, which extends into the dependent base 1a of the lower chamber, may be used when the apparatus is "on the pump" for drawing the liquid which is to be processed into the said chamber from a reservoir, exemplified by the flask 15. When the liquid is to be only partially dehydrated, the same tube 13 may be used for removing the fluid concentrate from the retort 1 by shutting off the vacuum pump and then opening the valve 13a.

In the embodiments of the invention shown in Figs. 1 to 4, inclusive, the interior of the dehydrator contains two series connected heaters in the form of hollow grid-like coils 17 and 19 (see Figs. 3 and 4) through which hot water, steam or other heating medium is circulated. The upper coil 17 is mounted within the hollow conduit 5 between the main and auxiliary chambers 1 and 3, well above the normal level of the liquid in the main chamber but in the path of the emanations from the said liquid. The lower coil 19 is immersed in the liquid, preferably in the dependent base 1a of the lower chamber or retort 1. The hollow tubes or pipes 18 and 20, which comprise the series connection between the upper and lower coils 17 and 19, may be arranged either inside the retort 1 (as shown in Fig. 1) or outside of the said retort (as shown in Fig. 2). In the latter case, these pipes 18 and 20 must be covered with insulation (21, Fig. 2), since the temperature of the external ambient must not be permitted to affect the heating medium which flows between the coils 17 and 19 through the said pipes.

As indicated by the arrows in Figs. 1 and 2, the hot water or other fluid heating medium flows first through the upper or "save-all" coil 17, thence downwardly through the pipe 18 to and through the lower or "heater" coil 19, then upwardly through the pipe 20 and out. When the outlet or return pipe 20 is on the outside of the retort 1, it may be led off adjacent to the base 1a and need not reenter the conduit 5.

The operation of the apparatus shown in Figs. 1 to 4, inclusive, is as follows: Hot water, steam or other fluid heating medium flowing through the lower coil 19 causes the liquid in the lower chamber 1 to boil and the boiling liquid gives off bubbles which rise and enter the heated zone about the upper coil 17. Because the heating medium flows first through the upper coil 17, its temperature will always be higher than that of the lower coil 19. The bubbles are broken up or explode as they approach or strike the upper coil 17, because much of the liquid of which the bubbles are comprised is evaporated in the heated zone about the said coil. Because of the evaporation occurring adjacent to the upper coil 17, energy in the form of heat is abstracted from the heating medium which flows through the said coil, and hence the temperature of the medium supplied to the lower coil 19 through the connecting pipe 18 will be lowered. Lowering the temperature of the heating medium flowing through the lower coil 19 causes the liquid in the retort 1 to boil or effervesce less vigorously. The quantity of foam or the number of bubbles reaching the heated zone about the upper coil 17 is thus reduced and the quantity of heat abstracted from the said coil and zone is likewise reduced. It follows that the less the quantity of heat abstracted from the upper coil, the larger the quantity available for heating the liquid about the coil 19 in the lower chamber 1. Thus, when the degree of effervescence is reduced to a point where very few bubbles reach the "save-all" coil 17, the temperature of the lower coil 19 will rise and the boiling and consequent production of foam will increase. It is thus entirely possible to place the required amount of solution in the retort 1, adjust the flow and temperature of the heating fluid to a desired value, and have the apparatus operate without further attention for a definite period of time at maximum efficiency without danger of excessive foaming.

It is not essential to the practice of the invention that the energy for boiling the liquid be derived from a steam or hot water coil. Thus, referring now to Fig. 5, such energy may be derived from a radio-frequency oscillator 25, in the manner taught by Brown and Bierwirth in abandoned application Serial No. 520,428, filed January 31, 1944, and by Brown in copending application Serial No. 631,491, filed May 20, 1944. In this event, the lower coil (19 of Figs. 1 and 2) is dispensed with and the power output of the oscillator is applied to the liquid by means of a pair of electrodes 27 and 29 affixed to the outside of the base 1a of the retort 1. The upper coil 17 operates as before to establish a heated zone wherein the bubbles arising from the boiling liquid are subject to evaporation and are caused to burst. The energy (heat) abstracted from the heated zone about the coil 17 by evaporation of these liquid films is manifest in the lowered temperature of the heating medium at the outlet side of the said coil. A thermostat 31, which is responsive to changes in the temperature of the heating medium passing through the coil 17, serves to control the quantity of heat or the degree of vacuum in the retort 1 and hence to regulate the effervescent condition of the liquid being treated. To this end, the thermostat 31 is connected to a circuit which includes the power supply line 33 for the oscillator 25 and the vacuum pump 7.

As shown in Fig. 5, the thermostat 31 operates to control both the vacuum pump 7 and the oscillator 25. However, satisfactory control of the effervescent condition of the liquid can usually be achieved by regulating the oscillator alone, or the pump alone, and two switches 35 and 37 are provided in the circuit so that, if desired, either the pump 7 or the oscillator 25 may be connected directly to the power supply source 33. The control exercised by the thermostat 31 may comprise an "on-off" action or it may be "continuously variable." In the latter event, it will be understood that a suitable relay and rheostat may be provided for regulating the current supplied to the vacuum pump 7 and that a similar device may be included either in the input or the output circuit of the oscillator. Alternatively, the thermostat may be employed for opening and closing a valve (not shown) in the vacuum line between the pump 7 and the upper chamber 3.

In using the apparatus of the present invention for the dehydration of penicillin liquor which has been subjected to an ether extraction process, it is preferable to pass bubbles of nitrogen or other inert or sterile gas through the liquor (for a period of, say, 45 minutes) to remove excess ether therefrom. It has heretofore been believed that penicillin liquor could not be concentrated while in its liquid state, and this has led to the use of cumbersome, expensive, and slow-acting "freeze-drying" equipment. The present invention confirms the above identified earlier filed Brown and Bierwirth disclosures that, under certain conditions, penicillin liquor can be subjected to relatively high temperatures while in the liquid state. Thus, in operating the apparatus of the present invention, it was found that penicillin liquor suffered no loss in the potency of its active ingredient (or "X-factor") when the vacuum in the apparatus was of the order of from, say, 1 to 3 millimeters of mercury and the temperature of the heating medium at the inlet of the "save-all" coil (17) was of the order of 120° Fahrenheit. By way of example, if the rate of flow of the heating medium (hot water) through the coils 17 and 19 is approximately 0.7 gallon per minute and the quantity of liquor in the retort is approximately one litre, the temperature of the liquor, as distinguished from that of the emanations therefrom, will be in the range of from 70° to approximately 120°. Under these conditions, it will take about 10 minutes to reduce 1000 cubic centimeters of penicillin to about 400 cubic centimeters without any apparent decrease in the potency of the drug.

When a radio-frequency oscillator operating at a frequency of the order of 27 megacycles per second was substituted for the lower "heater" coil (19), two kilowatts were applied for 10 minutes. This is the equivalent of 1140 B. t. u.'s.

What is claimed is:

1. Method of treating a liquid which effervesces when subjected to heat, said method comprising applying heat to said liquid to cause it to effervesce, establishing a flow of heat to and from a zone above the level of said liquid, causing the emanations of said effervescing liquid to enter said zone and to abstract heat therefrom, and then varying a subsequent quantity of heat applied to said liquid as determined solely by the difference between the temperature of the flow of heat to said zone and the temperature of the flow of heat from said zone whereby to regulate the intensity of effervescence of said liquid.

2. Method of treating a liquid which effervesces when subjected to heat, said method comprising applying heat to said liquid to cause it to effervesce, establishing a flow of heat to and from a zone above the level of said liquid, causing the emanations from said effervescent liquid to enter said zone and to abstract heat therefrom and thereby reduce the temperature of said heated zone, and then correspondingly decreasing the quantity of heat applied to said liquid as determined solely by the difference between the temperature of the flow of heat to said zone and the temperature of the flow of heat from said zone thereby to reduce the quantity of said emanations and hence correspondingly reduce the quantity of heat abstracted from said heated zone.

3. Method of concentrating a liquid containing a thermolabile ingredient, said method comprising subjecting said liquid to a partial vacuum, heating said liquid to a temperature sufficiently high to cause it to effervesce in said vacuum but not so high as to effect adversely the labile equilibrium of said ingredient, establishing a flow of heat to and from a zone in the path of the emanations from said effervescing liquid, causing said emanations to abstract some of the heat from said zone, and then varying a subsequent quantity of heat applied to said liquid as determined solely by the difference between the temperature of the flow of heat to said zone and the temperature of the flow of heat from said zone.

4. The method of heat treating a liquid containing a thermo-labile ingredient which comprises subjecting said liquid to a partial vacuum, heating said liquid while under the influence of said vacuum to a temperature sufficiently high to cause said liquid to effervesce but not so high as to affect adversely the labile equilibrium of said ingredient, establishing a flow of heat to and from a zone above the level of said liquid, causing the emanations from said effervescent liquid to enter said zone and to abstract heat therefrom and thereby reduce the temperature of said heated zone, and then correspondingly, decreasing the quantity of heat applied to said liquid as determined solely by the difference between the temperature of the flow of heat to said zone and the temperature of the flow of heat from said zone thereby to reduce the quantity of said emanations and hence correspondingly to reduce the quantity of heat abstracted from said heated zone.

RUDOLPH A. BIERWIRTH.

REFERENCES CITED

The following references are of record in the file of this patent:

UNITED STATES PATENTS

| Number | Name | Date |
|---|---|---|
| 1,056,877 | Anderson et al. | Mar. 25, 1913 |
| 1,202,969 | Cornell | Oct. 31, 1916 |
| 1,253,411 | Melchior | Jan. 15, 1918 |
| 2,042,488 | Theiler | June 2, 1936 |